(12) United States Patent
Kimura

(10) Patent No.: US 10,190,892 B2
(45) Date of Patent: *Jan. 29, 2019

(54) ENCODER

(71) Applicant: MITUTOYO CORPORATION, Kanagawa (JP)

(72) Inventor: Akihide Kimura, Saitama (JP)

(73) Assignee: MITUTOYO CORPORATION, Kanagawa (JP)

( * ) Notice: Subject to any disclaimer, the term of this patent is extended or adjusted under 35 U.S.C. 154(b) by 129 days.

This patent is subject to a terminal disclaimer.

(21) Appl. No.: 15/384,613

(22) Filed: Dec. 20, 2016

(65) Prior Publication Data

US 2017/0176218 A1    Jun. 22, 2017

(30) Foreign Application Priority Data

Dec. 22, 2015 (JP) ................... 2015-249274

(51) Int. Cl.
*G01D 5/347* (2006.01)

(52) U.S. Cl.
CPC ................ *G01D 5/34746* (2013.01)

(58) Field of Classification Search
CPC .. G01D 5/32; G01D 5/26; G01D 5/34; G01D 5/347; G01D 5/34707; G01D 5/34715; G01D 5/34746; G01D 5/34753; G01D 5/3473; G01D 5/34738
See application file for complete search history.

(56) References Cited

U.S. PATENT DOCUMENTS

| 4,461,083 A | * | 7/1984 | Ernst | ............ | G01D 5/247 |
| | | | | | 250/237 G |
| 5,050,993 A | * | 9/1991 | Tansey | ............ | G01D 5/38 |
| | | | | | 250/237 G |
| 5,235,181 A | * | 8/1993 | Durana | ............ | G01D 5/36 |
| | | | | | 250/231.14 |
| 5,424,829 A | * | 6/1995 | Sato | ............ | G01D 5/38 |
| | | | | | 250/237 G |

(Continued)

FOREIGN PATENT DOCUMENTS

JP    10-002717 A    1/1998

OTHER PUBLICATIONS

U.S. Appl. No. 15/384,628 to Akihide Kimura, filed Dec. 20, 2016.

*Primary Examiner* — John Lee
(74) *Attorney, Agent, or Firm* — Greenblum & Bernstein, P.L.C.

(57) ABSTRACT

A scale is provided with a reference mark and an incremental pattern. A detection head is relatively movable in a measurement direction with respect to the scale, and detects a light intensity distribution of diffracted beams if beams radiated onto the scale are diffracted by the reference mark, and outputs the detection result. A signal processing unit detects a reference position based on a position in the light intensity distribution where light intensity is lower than a predetermined value. The reference position has a plurality of pattern areas having a plurality of patterns arranged with a predetermined pitch in the measurement direction. At least one pattern area of the plurality of pattern areas is disposed with an offset from a neighboring pattern area in the measurement direction.

11 Claims, 6 Drawing Sheets

(56) References Cited

U.S. PATENT DOCUMENTS

| | | | | |
|---|---|---|---|---|
| 5,499,098 A * | 3/1996 | Ogawa | G01D 5/34 | 250/222.1 |
| 5,678,319 A * | 10/1997 | Huber | G01D 5/38 | 33/707 |
| 5,856,872 A * | 1/1999 | Horwitz | G01D 5/34715 | 250/231.17 |
| 5,874,729 A * | 2/1999 | Holzapfel | G01D 5/366 | 250/231.16 |
| 6,005,667 A * | 12/1999 | Takamiya | G01D 5/38 | 356/499 |
| 6,151,128 A * | 11/2000 | Huber | G01D 5/38 | 356/499 |
| 6,452,159 B2 | 9/2002 | Holzapfel | G01D 5/2457 | 250/231.13 |
| 7,554,078 B2 * | 6/2009 | Kawada | G01D 5/34715 | 250/231.13 |
| 9,310,225 B2 | 4/2016 | Maeda | | |
| 9,417,101 B2 * | 8/2016 | Nagura | G01D 5/34746 | |
| 2001/0046055 A1 * | 11/2001 | Speckbacher | G01D 5/38 | 356/499 |
| 2007/0107247 A1 * | 5/2007 | Meissner | G01D 5/34715 | 33/707 |
| 2007/0187583 A1 * | 8/2007 | Yaku | G01D 5/24476 | 250/231.13 |
| 2009/0040529 A1 * | 2/2009 | Watanabe | G01D 5/2457 | 356/499 |
| 2009/0272886 A1 * | 11/2009 | Kusano | G01D 5/2454 | 250/231.1 |
| 2009/0283667 A1 * | 11/2009 | Morimoto | G01D 5/24409 | 250/231.13 |
| 2010/0270461 A1 | 10/2010 | Tominaga | | |
| 2011/0141451 A1 * | 6/2011 | Yamaguchi | G01D 5/38 | 355/77 |
| 2011/0266424 A1 | 11/2011 | Kawatoko et al. | | |
| 2011/0299093 A1 * | 12/2011 | Ishizuka | G01D 5/266 | 356/498 |
| 2012/0217384 A1 * | 8/2012 | Nagura | G01D 5/34746 | 250/231.13 |
| 2013/0001412 A1 * | 1/2013 | Tobiason | G01D 5/38 | 250/231.1 |
| 2015/0060653 A1 * | 3/2015 | Yaku | G01D 5/34723 | 250/231.1 |
| 2015/0292919 A1 * | 10/2015 | Ogasawara | G01D 5/34776 | 318/640 |
| 2015/0354944 A1 * | 12/2015 | Drescher | G01D 5/38 | 356/494 |
| 2016/0109216 A1 * | 4/2016 | Saendig | G01B 11/00 | 356/499 |
| 2016/0153812 A1 | 6/2016 | Kato | | |
| 2016/0209246 A1 | 7/2016 | Kato | | |
| 2017/0030744 A1 * | 2/2017 | Kimura | G01D 5/266 | |
| 2017/0030745 A1 * | 2/2017 | Kimura | G01D 5/38 | |
| 2017/0176218 A1 * | 6/2017 | Kimura | G01D 5/34746 | |
| 2017/0176219 A1 * | 6/2017 | Kimura | G01D 5/34746 | |

* cited by examiner

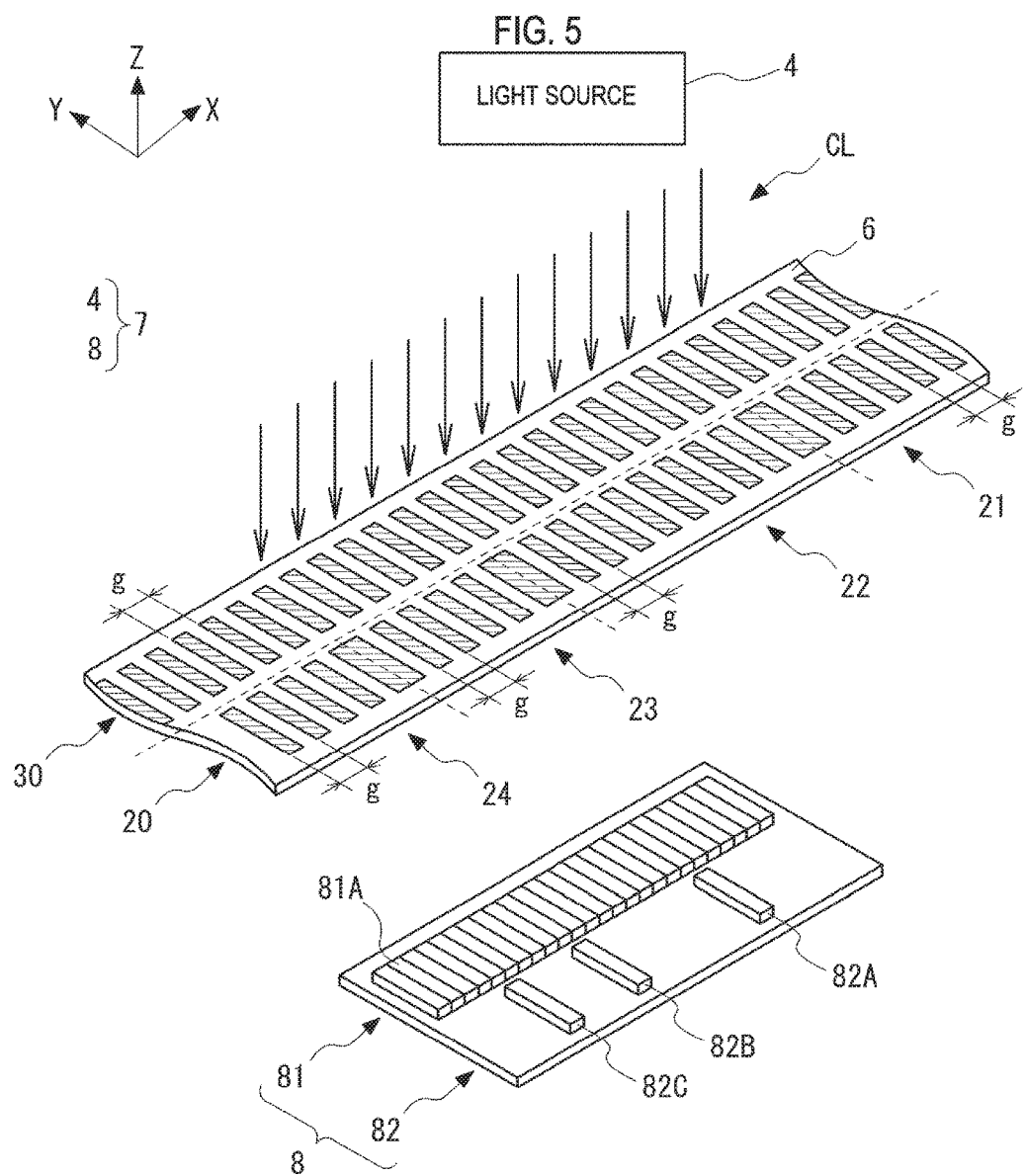

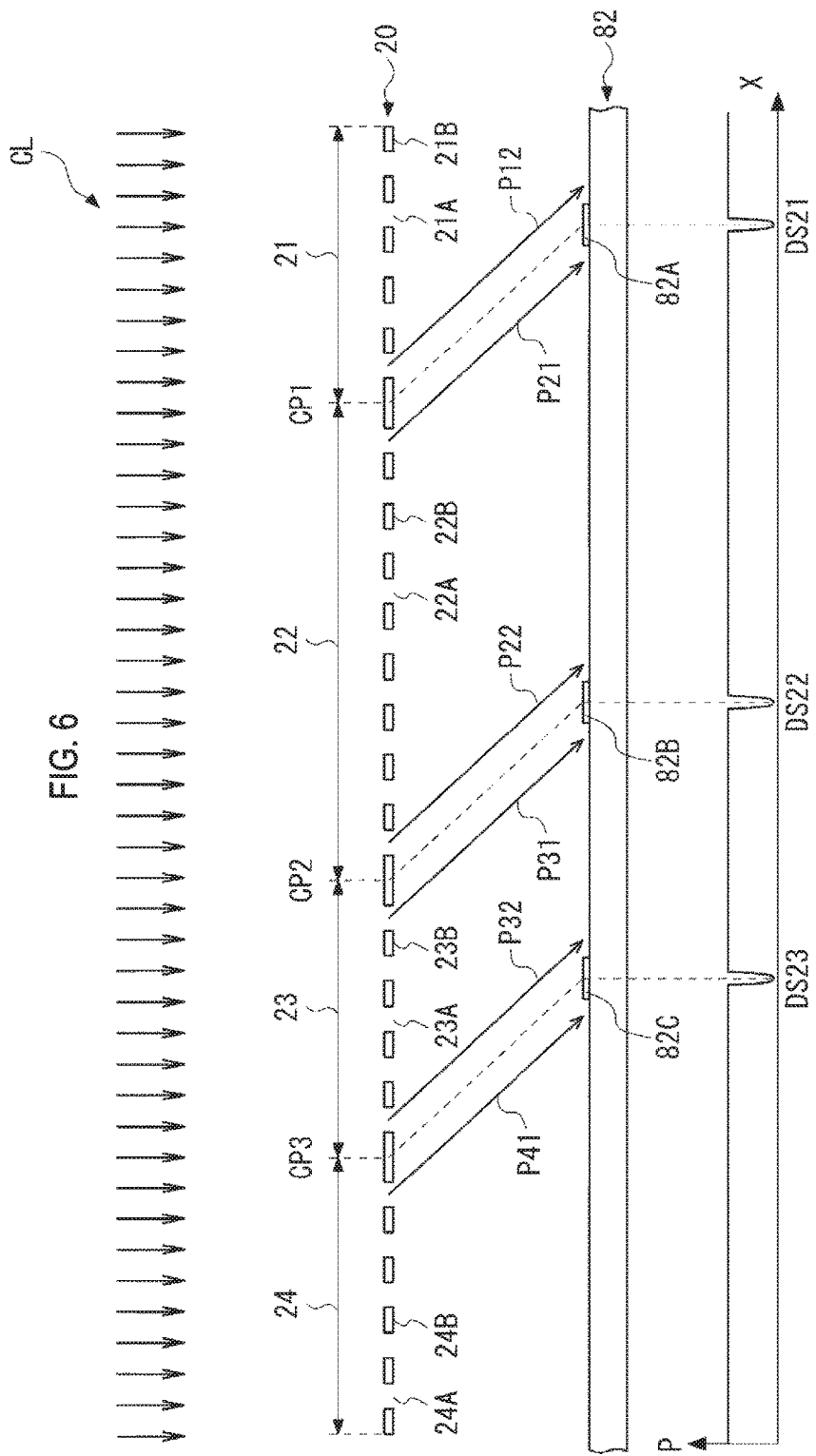

ENCODER

CROSS-REFERENCE TO RELATED APPLICATION

The present application claims priority from Japanese Patent Application No. 2015-249274 filed on Dec. 22, 2015, the entire content of which is incorporated herein by reference.

BACKGROUND

Technical Field

The present invention relates to an encoder, and particularly, to an optical encoder.

Related Art

There are now optical linear encoders as one type of devices for measuring an amount of movement. An optical linear encoder has a scale, and a detection head configured to move along the scale. The scale has an absolute pattern for detecting a reference position, and an incremental pattern for detecting an amount of relative movement between the scale and the detection head. The optical linear encoder determines a reference position based on a reference position signal representing a result of detection on the absolute pattern formed on the scale. Then, the optical linear encoder can detect the positional relation between the scale and the detection head, in view of an amount of movement from the reference position.

For example, as an example of such an optical encoder, there has been proposed a reference position detection device configured to make a dark area by a phase difference in light at a reference position and detect the dark area, thereby detecting a reference position (Patent Document 1). In this reference position detection device, a main scale allows parallel beams to pass in an arbitrary light-and-dark pattern. At this time, steps provided on the main scale cause a difference in light path length between an area where there are steps and an area where there are no steps. Therefore, between beams having passed through the area where there are the steps and beams having passed through the area where there are no steps, a phase difference occurs. For this reason, at the boundary between the area where there are the steps and the area where there are no steps, beams passing through the two areas interfere with each other, resulting in a reduction in light intensity, whereby a dark area occurs. A light receiving device measures the amount of beams having passed through a reference position slit. While the main scale moves, the amount of beams which the light receiving device detects becomes smallest when the dark area passes over the reference position slit. Therefore, it is possible to detect that position as the reference position.

Patent Document 1: Japanese Patent Application Laid-Open No. 10-2717

The above-described reference position detection device has a problem that the accuracy of reference position detection decreases due to change of temperature. If the temperature of the above-described main scale rises, the step height changes, and the light path length according to the steps also changes. For this reason, the phase difference between beams having passed through the area where there are the steps and beams having passed through the area where there are no steps also varies, and the contrast of the dark area decreases. As a result, a change in the accuracy of detection of the reference position is caused.

SUMMARY

Exemplary embodiments of the invention provide an encoder capable of performing detection of the reference position without being influenced by change of temperature.

An encoder according to a first aspect of the invention, comprises:

a scale having a reference mark and an incremental pattern;

a detection head configured to be relatively movable in a measurement direction with respect to the scale, and to detect a light intensity distribution of diffracted beams if beams radiated onto the scale are diffracted by the reference mark and to output a detection result; and a signal processing unit configured to detect a reference position based on a position in the light intensity distribution where light intensity is lower than a predetermined value, wherein the reference mark has a plurality of pattern areas having a plurality of patterns arranged with a predetermined pitch in the measurement direction, and at least one pattern area of the plurality of pattern areas is disposed with an offset from a neighboring pattern area in the measurement direction.

An encoder according to a second aspect of the invention is preferably the encoder, wherein the offset is half of the pitch of patterns repeatedly disposed in the measurement direction.

An encoder according to a third aspect of the invention is preferably the encoder, wherein the detection head detects the light intensity distribution of positive first-order diffracted beams and/or negative first-order diffracted beams diffracted by the reference mark.

An encoder according to a fourth aspect of the invention is preferably the encoder, wherein the plurality of pattern areas is disposed such that a plurality of joint lines occurs due to an offset of one or both of two neighboring pattern areas.

An encoder according to a second aspect of the invention is preferably the encoder, wherein the joint lines are disposed in a random manner or a pseudo-random manner.

An encoder according to a sixth aspect of the invention is preferably the encoder, wherein the joint lines are disposed based on an M-sequence code.

According to the present invention, it is possible to provide an encoder capable of performing detection of the reference position without being influenced by change of temperature.

The above and other objects, features and merits of the present invention will be more completely understood from the following detailed description and the accompanying drawings. The accompanying drawings are only for illustration, and do not limit the present invention.

BRIEF DESCRIPTION OF THE DRAWINGS

FIG. 5 is a perspective view schematically illustrating the configuration of an optical encoder according to a second embodiment.

FIG. 6 is a view illustrating interference of diffracted beams and the light intensity distribution of interference fringes in the optical encoder according to the second embodiment.

DETAILED DESCRIPTION

Figure 1:
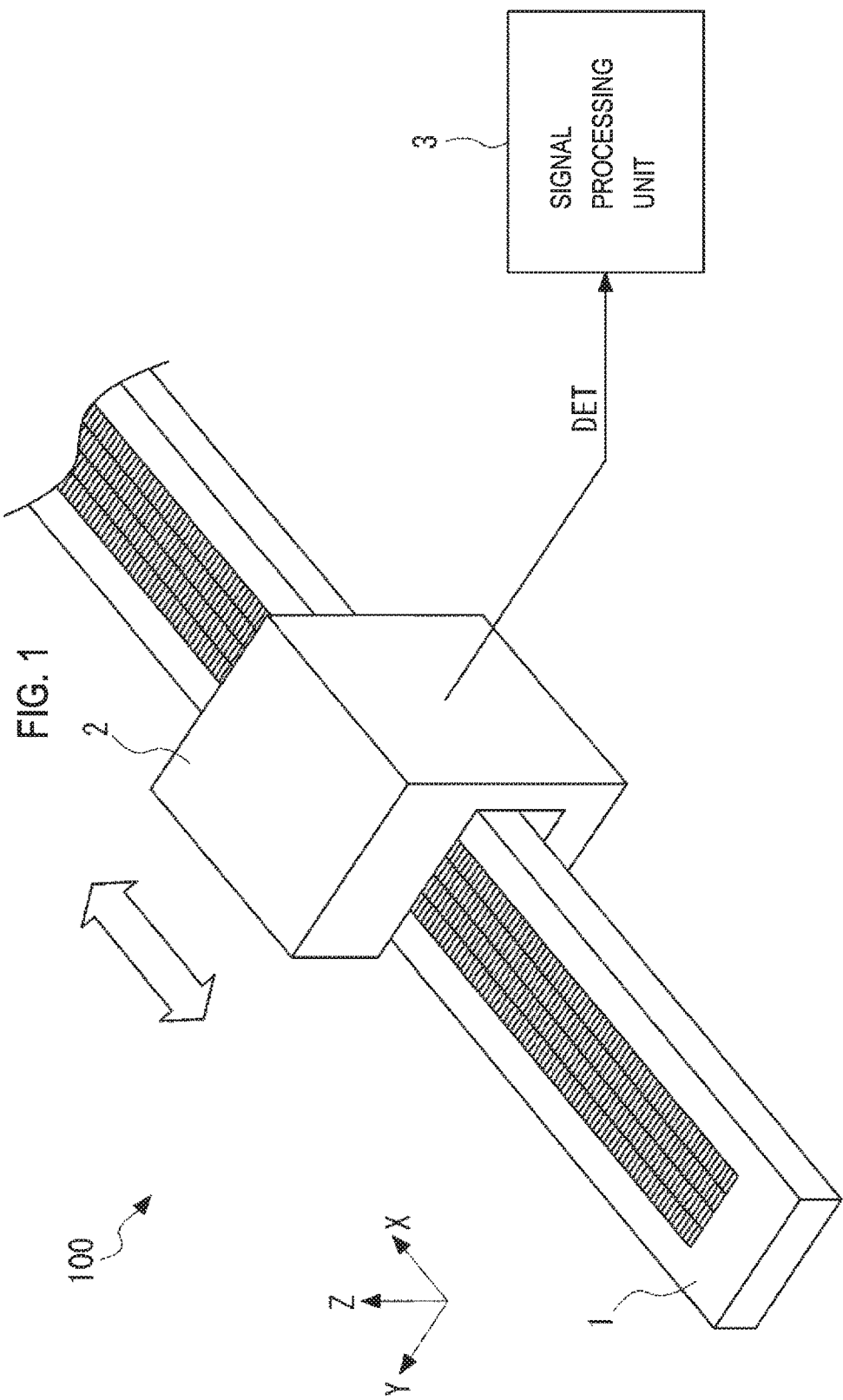
FIG. 1 is a perspective view schematically illustrating the configuration of an optical encoder according to a first embodiment.

Hereinafter, embodiments of the present invention will be described with reference to the accompanying drawings. In the drawings, identical components are denoted by the same reference symbols, and a repeated description thereof is omitted if necessary. The following encoders according to embodiments are configured as optical encoders for detecting light from a grating pattern and calculating a position.

First Embodiment

An optical encoder according to a first embodiment of the present invention will be described. FIG. 1 is a perspective view schematically illustrating the configuration of an optical encoder 100 according to the first embodiment. As shown in FIG. 1, the optical encoder 100 has a scale 1, a detection head 2, and a signal processing unit 3. The scale 1 and the detection head 2 are configured to be relatively movable along a measurement direction (an X axis direction of FIG. 1) which is the longitudinal direction of the scale 1. The scale 1 has a pattern for position detection, and if beams are radiated onto the pattern, interfering beams occur. The detection head 2 detects a change of the interfering beams in the measurement direction, and outputs an electric signal representing the detection result, to the signal processing unit 3. The signal processing unit 3 performs signal processing on the received electric signal (a detection signal DET of FIG. 1), thereby capable of detecting the positional relation between the scale 1 and the detection head 2.

Also, hereinafter, a direction perpendicular to the measurement direction (the direction of an X axis of FIG. 1) and representing the width of the scale 1 will be referred to as a Y axis. In other words, a principal plane of the scale 1 is an X-Y plane. Also, a direction perpendicular to the principal plane of the scale 1 (the X-Y plane), that is, a direction perpendicular to the X axis and the Y axis will be referred to as a Z axis. Also, in each perspective view to be referred to below, a direction from the lower left side (a direction toward a viewer) toward the upper right side (a direction away from the viewer) on the drawing sheet will be referred to as the positive direction of the X axis. A direction from the lower right side (a direction toward the viewer) toward the upper left side (a direction away from the viewer) on the drawing sheet will be referred to as the positive direction of the Y axis. A direction from the lower side toward the upper side on the drawing sheet will be referred to as the positive direction of the Z axis.

Figure 2:
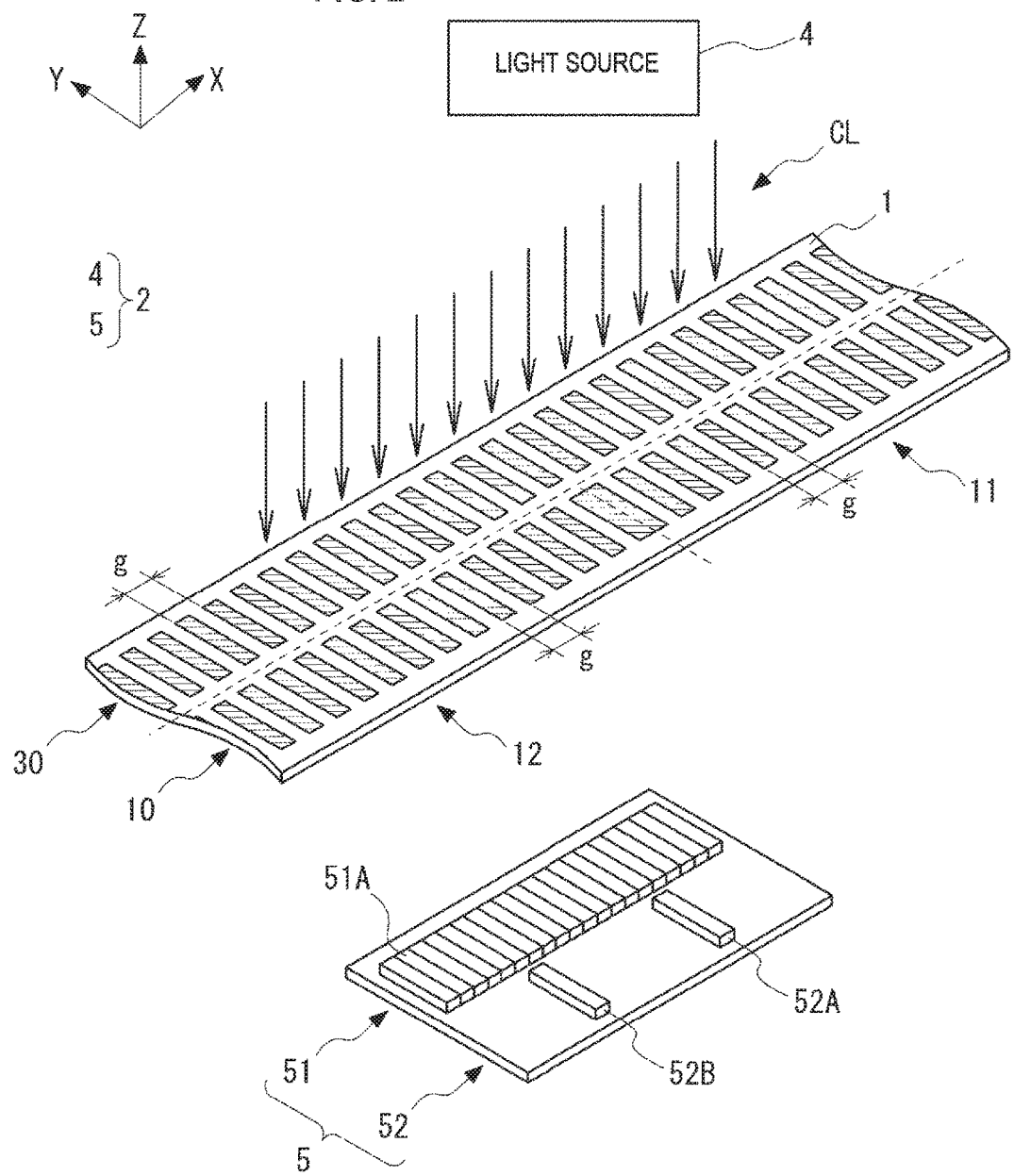
FIG. 2 is a perspective view illustrating the configuration of the optical encoder according to the first embodiment.
Figure 3:
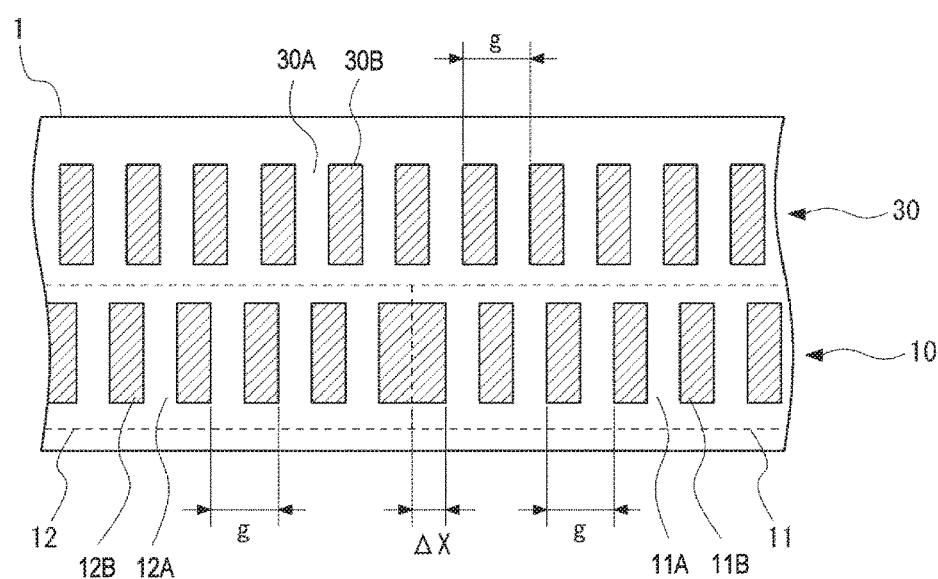
FIG. 3 is a top view schematically illustrating the configuration of a scale according to the first embodiment.

The optical encoder 100 will be described in more detail. FIG. 2 is a perspective view illustrating the configuration of the optical encoder 100 according to the first embodiment. As shown in FIG. 3, the detection head 2 has a light source 4 and a detecting unit 5. As described above, the scale 1 and the detection head 2 are configured to be relatively movable in the measurement direction (the X axis direction of FIG. 2).

FIG. 3 is a top view schematically illustrating the configuration of the scale 1 according to the first embodiment. The scale 1 is a plate-like member which has a plane (the X-Y plane) perpendicular to the Z axis of FIG. 3, as its principal plane, and whose longitudinal direction is aligned in the X axis direction. The scale 1 is disposed at a position where parallel beams from the light source 4 enter in a direction perpendicular to the principal plane (the X-Y plane). In FIG. 2, the scale 1 is disposed on the negative direction of the Z axis from the light source 4.

In the plate-like member constituting scale 1, an incremental pattern 30 and a reference mark 10 are formed.

In the incremental pattern 30, a plurality of translucent parts is disposed side by side in the X axis direction, in such a grating pattern that their longitudinal directions are aligned in the Y axis of FIGS. 2 and 3. In other words, in the incremental pattern 30, translucent parts 30A and non-translucent parts 30B are alternately repeated in the X axis direction with a pitch "g".

The reference mark 10 has a first pattern area 11 and a second pattern area 12 arranged in the X axis direction. In each of the first pattern area 11 and the second pattern area 12, a plurality of translucent parts is arranged side by side in the X axis direction, in such a grating pattern that their longitudinal directions are aligned in the Y axis of FIGS. 2 and 3. In other words, in the first pattern area 11, translucent parts 11A and non-translucent parts 11B are alternately repeated in the X axis direction with the pitch "g". In the second pattern area 12, translucent parts 12A and non-translucent parts 12B are alternately repeated in the X axis direction with the pitch "g".

In other words, in the incremental pattern 30, the first pattern area 11, and the second pattern area 12, the translucent parts and the non-translucent parts are arranged with the common pitch "g". Also, in the present embodiment, the translucent parts 30A, 11A, and 12A have the same width, and the non-translucent parts 30B, 11B, and 12B have the same width. Therefore, on the incremental pattern 30, the first pattern area 11, and the second pattern area 12, similar grating patterns are formed.

In the present embodiment, the first pattern area 11 and the second pattern area 12 are disposed with an offset $\Delta X$ in the X axis direction. The offset $\Delta X$ is set within a range larger than $0°$ ($0$ [rad]) and smaller than $360°$ ($2\pi$ [rad]). For ease of explanation, in FIGS. 2 and 3, a case where the offset $\Delta X$ is $180°$ ($\pi$ [rad]) is shown.

Also, the term "offset" comprehensively includes a case where the second pattern area 12 is offset with reference to the first pattern area 11 by $\Delta X$, a case where the first pattern area 11 is offset with reference to the second pattern area 12 by $\Delta X$, and a case where both of the first pattern area 11 and the second pattern area 12 are offset with reference to the scale 1 (for example, the incremental pattern 30), and the sum of the offsets of them is $\Delta X$. This is not limited to the first pattern area 11 and the second pattern area 12, and is applied even to two pattern areas neighboring each other in the measurement direction (the X axis direction) in a case where there is a plurality of (three or more) pattern areas. In other words, the plurality of (three or more) pattern areas needs only to include at least one pattern area offset in the measurement direction (the X axis direction).

It is preferable that the scale 1 be made of glass. In this case, for example, the non-translucent parts are formed by evaporating a metal layer on the glass. In this case, areas where there is no metal layer become the translucent parts. However, it is possible to use any other material to make the scale 1 as long as it is possible to make the translucent parts capable of transmitting light and the non-translucent parts incapable of transmitting light in a grating pattern.

With reference to FIG. 2, the configuration of the detection head 2 will be described. First, the light source 4 will be described. The light source 4 is a light source for outputting parallel beams CL. The light source 4 has, for example, a light source device and a collimator. The light source device outputs light, which is then collimated into parallel beams CL by the collimator. As the light source device, for example, a light emitting diode (LED), a semiconductor laser, a self-scanning light emitting device (SLED), or an organic light-emitting device (OLED) can be used. Also, as the collimator, various collimating means such as an optical lens system can be used.

The detecting unit 5 will be described. The detecting unit 5 is configured to be able to detect light having passed through the scale 1. The detecting unit 5 has a light receiving section 51 and a light receiving section 52. The light receiving section 51 and the light receiving section 52 are arranged side by side in the Y axis direction.

The light receiving section 51 is configured to be able to detect light having passed through the incremental pattern 30 and output the detection result to the signal processing unit 3. For example, the light receiving section 51 performs photoelectric conversion on light having passed through the incremental pattern 30, thereby obtaining an electric signal, and outputs the electric signal to the signal processing unit 3. The light receiving section 51 is configured, for example, as a light-receiving-device array of a plurality of light receiving devices (for example, photodiodes) arranged with a pitch smaller than that of the incremental pattern 30 (for example, half or one-fourth of the pitch of the incremental pattern). Also, the light receiving section 51 may be configured by forming a grating with the same pitch as that of the incremental pattern 30 on a photodiode having a large light reception area.

The light receiving section 52 is configured to be able to detect diffracted beams other than a zeroth-order diffracted beam of light having passed through the reference mark 10 and output the detection result to the signal processing unit 3. For example, the light receiving section 52 performs photoelectric conversion on diffracted beams other than a zeroth-order diffracted beam of light having passed through the reference mark 10, thereby obtaining an electric signal, and outputs the electric signal to the signal processing unit 3. In this case, light receiving devices (for example, photodiodes) for detecting diffracted beams other than a zeroth-order diffracted beam are disposed at positions satisfying diffraction angles based on diffraction orders.

In the present embodiment, an example in which the light receiving section 52 detects a positive first-order diffracted beam and a negative first-order diffracted beam will be described. The light receiving section 52 has light receiving devices 52A and 52B. The light receiving device 52A is disposed at a position based on the diffraction angle of the positive first-order diffracted beam as seen from the reference mark 10. The light receiving device 52B is disposed at a position based on the diffraction angle of the negative first-order diffracted beam as seen from the reference mark 10. In other words, the light receiving devices 52A and 52B are disposed on the opposite sides of the center of the detection head 2 in the X axis direction.

Figure 4:
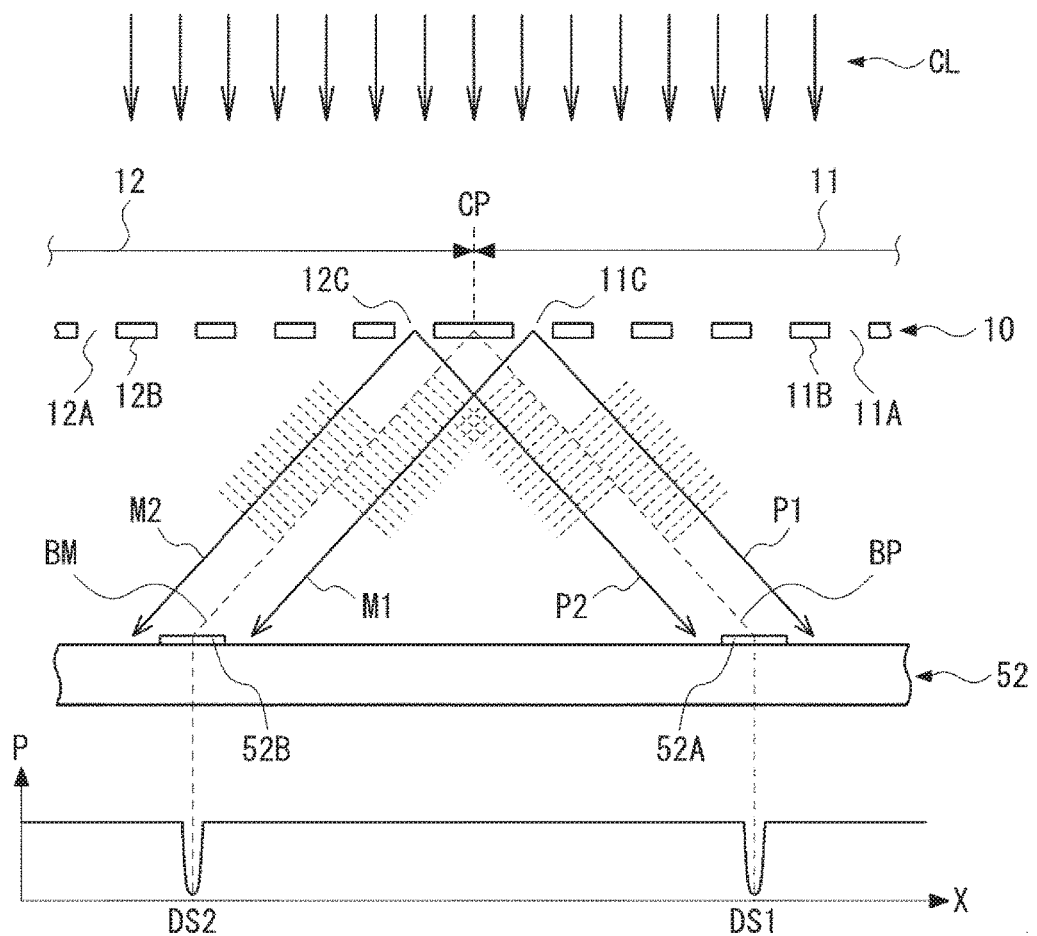
FIG. 4 is a view illustrating interference of diffracted beams and the light intensity distribution of interference fringes in the optical encoder according to the first embodiment.

Now, the property of light having passed through the reference mark 10 will be described. FIG. 4 is a view illustrating interference of diffracted beams and the light intensity distribution of interference fringes in the optical encoder 100 according to the first embodiment. Parallel beams CL enter the reference mark 10, and are diffracted by the reference mark 10, whereby diffracted beams occur.

Hereinafter, for ease of explanation, a description will be made with a focus on positive first-order diffracted beams and negative first-order diffracted beams.

Here, the center of the reference mark 10, that is, a point on the joint line of the first pattern area 11 and the second pattern area 12 is referred to as the center point CP. A translucent part 11A of the first pattern area 11 closest to the center point CP is referred to as the translucent part 11C. A translucent part 12A of the second pattern area 12 closest to the center point CP is referred to as the translucent part 12C.

If the scale 1 reaches a reference position, a positive first-order diffracted beam P1 from the translucent part 11C of the first pattern area 11 and a positive first-order diffracted beam P2 from the translucent part 12C of the second pattern area 12 reach the detecting unit 5 over the same light path length. Also, a negative first-order diffracted beam M1 from the translucent part 11C of the first pattern area 11 and a negative first-order diffracted beam M2 from the translucent part 12C of the second pattern area 12 reach the detecting unit 5 over the same light path length.

As described above, the first pattern area 11 and the second pattern area 12 are disposed with the offset ΔX in the X axis direction. Therefore, on the light receiving surface of the detecting unit 5, between the positive first-order diffracted beam P1 diffracted by the first pattern area 11 and the positive first-order diffracted beam P2 diffracted by the second pattern area 12, a relative phase difference attributable to the offset occurs. This phase difference Δθ can be expressed as the following Expression 1. In Expression 1, "s" is the absolute value of the order of the diffracted beams, $$\Delta\theta = \frac{2\pi \cdot s \cdot \Delta X}{g} \quad \text{[Expression 1]}$$

In this case, between the positive first-order diffracted beam P1 and the positive first-order diffracted beam P2, a phase difference Δθ in a case where "s" of Expression 1 is 1 as described above occurs. Therefore, the positive first-order diffracted beam P1 and the positive first-order diffracted beam P2 propagating from the two closest translucent parts symmetrically disposed in the X axis direction with the center point CP interposed therebetween are cancelled by each other in the vicinity of a boundary BP, whereby the light intensity on the light receiving surface of the detecting unit 5 becomes weak in the diffraction angle direction of the positive first-order diffracted beams as seen from the center point CP of the reference mark 10. As a result, in the distribution of light intensities P, a dark part DS1 occurs as shown in FIG. 4.

Also, between the negative first-order diffracted beam M1 and the negative first-order diffracted beam M2, a phase difference Δθ in a case where "s" of Expression 1 is 1 as described above occurs. Therefore, the negative first-order diffracted beam M1 and the negative first-order diffracted beam M2 propagating from the two closest translucent parts symmetrically disposed in the X axis direction with the center point CP interposed therebetween are cancelled by each other in the vicinity of a boundary BM, whereby the light intensity on the light receiving surface of the detecting unit 5 becomes weak in the diffraction angle direction of the negative first-order diffracted beams as seen from the center point CP of the reference mark 10. As a result, in the distribution of the light intensities P, a dark part DS2 occurs as shown in FIG. 4.

Therefore, if the light receiving devices 52A and 52B are disposed at positions corresponding to the dark part DS1 and the dark part DS2, respectively, the detecting unit 5 can detect the dark parts. Since positions where dark parts occur can be uniquely determined based on the diffraction orders of diffracted beams as described above, when a dark part is detected, it is possible to detect the position of the scale 1 as a reference position. For example, if a threshold for electric signals which the light receiving devices output is set, the signal processing unit 3 can easily generate a reference position pulse signal which starts at a timing when the voltage of an electric signal becomes lower than the threshold and finishes at a timing when the voltage of the electric signal becomes higher than the threshold.

Also, it is obvious that, as the phase difference $\Delta\theta$ between diffracted beams propagating from the two closest translucent parts symmetrically disposed in the X axis direction with the center point CP interposed therebetween increases, the contrast of dark parts increases. Therefore, in a case where the phase difference is 180°, the dark parts have the highest contrast. Therefore, if Expression 1 is solved for the offset $\Delta X$, and $\pi$ (180°) is assigned to the phase difference $\Delta\theta$, an offset $\Delta X_{MAX}$ at which a dark part related to s-th-order diffracted beams has the highest contrast is expressed as the following Expression 2.

$$\Delta X_{MAX} = \frac{g}{2s} \quad \text{[Expression 2]}$$

If attention is focused on the positive first-order diffracted beams or the negative first-order diffracted beams, it can be seen that an offset at which the dark parts have the highest contrast is half (g/2) of the pitch "g" of the patterns.

Now, the influence of change of temperature on the optical encoder 100 will be described. If the temperature of the scale 1 changes, for example, due to a change in ambient temperature or heat generation, the scale 1 slightly expands or contracts as compared to the size of the entire scale 1. Therefore, the pitch "g" of the reference mark 10 of the scale 1 also varies. If the coefficient of thermal expansion of the material constituting the scale 1 is represented by L, a pitch in a case where thermal expansion or thermal contraction has occurred is L×g.

Also, it is obvious that, similarly to the pitch, the offset $\Delta X$ in the X axis direction is also influenced by thermal expansion or thermal contraction. Therefore, an offset in a case where thermal expansion or thermal contraction has occurs is L×$\Delta X$. If the phase difference in that case is represented by $\Delta\theta_T$, $\Delta\theta_T$ can be obtained by replacing the pitch "g" and offset $\Delta X$ of Expression 1 with L×g and L×$\Delta X$, respectively. Therefore, the phase difference $\Delta\theta_T$ in the case where thermal expansion or thermal contraction has occurred is expressed as the following Expression 3.

$$\Delta\theta_T = \frac{2\pi \cdot s \cdot (L \cdot \Delta X)}{L \cdot g} \quad \text{[Expression 3]}$$
$$= \frac{2\pi \cdot s \cdot \Delta X}{g}$$
$$= \Delta\theta$$

As shown by Expression 3, since the coefficient L of thermal expansion of the denominator and the coefficient L of thermal expansion of the numerator can be cancelled, it can be understood that, even if thermal expansion or thermal contraction occurs, the phase difference $\Delta\theta$ does not vary. Therefore, even if a change in temperature occurs, the contrast of the dark parts of the light intensity distribution which the detecting unit 5 detects does not vary. Therefore, it can be understood that it is possible to implement stable reference position detection regardless of change of temperature.

Also, since the phase difference does not depend on parallel beams which the light source 4 outputs, change of the light path length does not influence the accuracy of detection of the reference position. This respect also makes high-accuracy reference position detection possible.

Second Embodiment

An optical encoder according to a second embodiment of the present invention will be described. FIG. 5 is a perspective view schematically illustrating the configuration of an optical encoder according to the second embodiment. As shown in FIG. 5, the optical encoder has a configuration obtained by replacing the scale 1 and the detection head 2 of the optical encoder 100 according to the first embodiment with a scale 6 and a detection head 7, respectively.

FIG. 6 is a view illustrating interference of diffracted beams and the light intensity distribution of interference fringes in the optical encoder according to the second embodiment. The scale 6 has a configuration obtained by replacing the reference mark 10 of the scale 1 with a reference mark 20. In the reference mark 10 of the scale 1, there are two areas where the patterns are disposed, and the two pattern areas are disposed with the offset in the X axis direction. However, in the reference mark 20, three or more pattern areas are arranged in the X axis direction, and every two neighboring pattern areas are disposed with an offset in the X axis direction. Here, an example in which the reference mark 20 has four pattern areas will be described. In the reference mark 20, first to fourth pattern areas 21 to 24 are disposed in order in a direction from the positive side of the X axis toward the negative side.

In each of the first to fourth pattern areas 21 to 24, similarly in the first pattern area 11 and the second pattern area 12 according to the first embodiment, a plurality of translucent parts is arranged side by side in the X axis direction, in such a grating pattern that their longitudinal directions are aligned in the Y axis of FIGS. 5 and 6. In other words, in the first to fourth pattern areas 21 to 24, translucent parts 21A to 24A and non-translucent parts 21B to 24B are alternately repeated in the X axis direction with the pitch "g", respectively. The translucent parts 30A of the incremental pattern 30 and the translucent parts 21A to 24A have the same widths as the widths of the non-translucent parts 30B of the incremental pattern 30 and the non-translucent parts 21B to 24B, respectively. Therefore, in the incremental pattern 30 and the first to fourth pattern areas 21 to 24, similar grating patterns are formed.

Also, the numbers of translucent parts and non-translucent parts of the first to fourth pattern areas 21 to 24 may be the same or may be different. Also, the numbers of translucent parts and non-translucent parts of some of the pattern areas may be the same and the numbers of translucent parts and non-translucent parts of the other pattern areas may be different.

In this example, an offset between the first pattern area 21 and the second pattern area 22, an offset between the second pattern area 22 and the third pattern area 23, and an offset between the third pattern area 23 and the fourth pattern area 24 are represented by ΔX1, ΔX2, and ΔX3, respectively. The offsets ΔX1 to ΔX3 may be the same, or may be different. Otherwise, only some of them may be the same.

The detection head 7 has a configuration obtained by replacing the detecting unit 5 of the detection head 2 with a detecting unit 8. The detecting unit 8 has a light receiving section 81 and a light receiving section 82. The light receiving section 81 and the light receiving section 82 are arranged side by side in the Y axis direction.

The light receiving section 81 has the same configuration as that of the light receiving section 51, and is configured to be able to detect light having passed through the incremental pattern 30 and output the detection result to the signal processing unit 3. Light receiving devices 81A of the light receiving section 81 correspond to light receiving devices 51A of the detecting unit 5.

The light receiving section 82 is configured to be able to detect diffracted beams other than a zeroth-order diffracted beam of light having passed through the reference mark 20 and output the detection result to the signal processing unit 3. In the present embodiment, for ease of explanation, an example in which the light receiving section 82 detects positive first-order diffracted beams will be described. In the light receiving section 82, light receiving devices 82A to 82C for detecting positive first-order diffracted beams are disposed at positions satisfying diffraction angles based on the positive first-order diffracted beams.

Since the first to fourth pattern areas 21 to 24 are disposed with the offsets as described above, in the light intensity of the positive first-order diffracted beams on the light receiving surface of the detecting unit 5, on the same principle as that described in the first embodiment, dark parts DS21 to D23 occur at positions corresponding to the center points CP1 to CP3 of the joint lines of the pattern areas. In an example shown in FIG. 6, a positive first-order diffracted beam P12 and a positive first-order diffracted beam P21 from both sides of the center point CP1 interfere with each other, whereby the dark part DS21 occurs. A positive first-order diffracted beam P22 and a positive first-order diffracted beam P31 from both sides of the center point CP2 interfere with each other, whereby the dark part DS22 occurs. A positive first-order diffracted beam P32 and a positive first-order diffracted beam P41 from both sides of the center point CP3 interfere with each other, whereby the dark part DS23 occurs. Also, since positions where the dark parts DS21 to D23 appear can be determined based on design of the scale 6 of the optical encoder and the distance between the scale 6 and the detecting unit 8, the light receiving devices 82A to 82C disposed at intervals of distances based on the positions where the dark parts DS21 to D23 appear can detect the dark parts DS21 to D23 moving with movement of the scale 6 in the X axis direction, and detect a detected value as a reference position.

In the present embodiment, more light receiving devices may be provided in the detecting unit such that it is possible to perform more accurate reference position detection, for example, by averaging reference position detection results of the individual light receiving devices. Also, the detecting unit can be configured by disposing patterns having translucent parts (slits) at intervals of distances based on the positions where the dark parts DS21 to D23 appear, on a light receiving device having a large area. In this case, it is possible to increase the amount of light reception of the light receiving device at non-reference positions. Also, since the light intensity of each translucent part decreases at a reference position, between the reference position and the non-reference positions, a difference in the light intensity which the light receiving device detects increases. Therefore, detection of the reference position becomes easier.

Also, in the present embodiment, the example in which the reference mark 20 has four pattern areas (the number of the joint lines of the pattern areas is three) has been described. However, the number of pattern areas may be three (the number of the joint lines of pattern areas may be two), or may be five or more (the number of the joint lines of pattern areas may be four or more).

Also, the positions of the joint lines of pattern areas may be disposed in a random manner, and may be disposed based on a pseudo-random code such as an M-sequence code. If an M-sequence code is used, it is possible to further increase the difference in the light intensity which the light receiving device detects, between the reference position and the non-reference positions. It is obvious that, if a longer M-sequence code is used, it is possible to improve the difference in the light intensity which the light receiving device detects, between the reference position and the non-reference positions.

Therefore, according to this configuration, it is possible to implement an encoder capable of more easily detecting a reference position with higher accuracy.

Other Embodiments

Also, the present invention is not limited to the above-described embodiments, but can be appropriately modified without departing from the scope of the present invention. For example, in the above-described embodiments, the case where there are two consecutive non-translucent parts at the joint line of two pattern areas of the reference mark has been described. However, in a case where the offset ΔX is within a range larger than π and smaller than 2π, the non-translucent parts may be disposed at intervals with the center point CP interposed therebetween, and translucent parts may exist in an area including the center point CP. Even in this case, since a phase difference occurs between diffracted beams from two closest translucent parts symmetrically disposed in the X axis direction with the center point CP interposed therebetween, similarly, dark parts occur.

The above-described encoders according to the embodiments have been described as transmissive optical encoders, but can be applied even to reflective optical encoders. In this case, it is required to replace the translucent parts and non-translucent parts of the grating pattern of the scale with reflective parts and non-reflective parts, respectively. Also, it is required to dispose a light receiving unit on the light source (4) side from the scale.

Also, it goes without saying that the above-described encoders according to the embodiments are not limited to linear encoders and can be configured as rotary encoders.

What is claimed is:
1. An encoder comprising:
a scale having a reference mark and having an incremental pattern;
a detection head configured to be relatively movable in a measurement direction with respect to the scale, and to detect a light intensity distribution of diffracted beams, when beams radiated onto the scale are diffracted by the reference mark and to output a detection result, the detection head including a light receiver, the light receiver being positioned so as to be able to detect diffracted beams other than a zeroth-order diffracted beam of light that passed through the reference mark; and a signal processor configured to detect a reference position based on a position in the light intensity distribution where light intensity is lower than a predetermined value, wherein the reference mark comprises a plurality of pattern areas arranged sequentially in the measurement direction and having a plurality of patterns each having a predetermined equal pitch in the measurement direction, each of the patterns comprising spaced pattern elements with the spaces between the pattern elements being devoid of pattern elements and at least one pattern area of the plurality of pattern areas is disposed with an offset, in the measurement direction, with respect to a neighboring pattern area.

2. The encoder according to claim 1, wherein:

the offset is half of the predetermined equal pitch of the plurality of patterns repeatedly disposed in the measurement direction.

3. The encoder according to claim 1, wherein:

the detection head detects the light intensity distribution of positive first-order diffracted beams and/or negative first-order diffracted beams diffracted by the reference mark.

4. The encoder according to claim 1, wherein:

the plurality of pattern areas is disposed such that a plurality of joint lines occurs due to an offset of one or both of two neighboring pattern areas.

5. The encoder according to claim 4, wherein:

the joint lines are disposed in a random manner or a pseudo-random manner.

6. The encoder according to claim 5, wherein:

the joint lines are disposed based on an M-sequence code.

7. The encoder according to claim 1, wherein the incremental pattern and the plurality of pattern areas of the reference mark have a same pitch.

8. The encoder according to claim 1, further comprising a joint line provided between each of the plurality of pattern areas.

9. The encoder according to claim 1, wherein a pitch of the incremental pattern in the measurement direction is equal to the predetermined pitch of the pattern areas of the reference mark.

10. The encoder according to claim 1, wherein the offset is equal to one half of the predetermined pitch of the reference mark, in the measurement direction.

11. The encoder according to claim 1, wherein the offset is larger than 180°.

* * * * *